United States Patent
Hundemer

(10) Patent No.: US 9,462,196 B1
(45) Date of Patent: *Oct. 4, 2016

(54) SYSTEMS AND METHODS FOR CAUSING A STUNT SWITCHER TO RUN A BUG-OVERLAY DVE WITH ABSOLUTE TIMING RESTRICTIONS

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/458,789

(22) Filed: Aug. 13, 2014

Related U.S. Application Data

(63) Continuation of application No. 13/828,939, filed on Mar. 14, 2013, now Pat. No. 9,094,618.

(51) Int. Cl.
    *H04N 5/268*     (2006.01)
    *H04N 5/262*     (2006.01)

(52) U.S. Cl.
    CPC .................................... *H04N 5/268* (2013.01)

(58) Field of Classification Search
    CPC .............................. H04N 5/268; H04N 5/262
    USPC ......................................................... 348/705
    See application file for complete search history.

(56) References Cited

U.S. PATENT DOCUMENTS

| | | | |
|---|---|---|---|
| 5,485,611 A | 1/1996 | Astle | |
| 5,892,535 A | 4/1999 | Allen et al. | |
| 7,051,354 B2 | 5/2006 | Mears | |
| 8,201,201 B2 | 6/2012 | Des Jardins | |
| 8,259,232 B2 | 9/2012 | Iino | |
| 8,789,124 B1 | 7/2014 | Malaby et al. | |
| 2002/0107940 A1 | 8/2002 | Brassil | |
| 2002/0184047 A1 | 12/2002 | Plotnick et al. | |
| 2003/0126597 A1 | 7/2003 | Darby et al. | |
| 2003/0146915 A1 | 8/2003 | Brook et al. | |
| 2003/0188321 A1 | 10/2003 | Shoff et al. | |

(Continued)

OTHER PUBLICATIONS

Non-Final Office Action dated Jan. 5, 2015 of U.S. Appl. No. 13/828,632, filed Mar. 14, 2013.

(Continued)

*Primary Examiner* — Jefferey Harold
*Assistant Examiner* — Justin Sanders
(74) *Attorney, Agent, or Firm* — McDonnell Boehnen Hulbert & Berghoff LLP

(57) ABSTRACT

In one aspect, a computer-readable medium includes a set of program instructions that when executed cause performance of a set of functions involving (i) selecting a first log-entry from a traffic log, wherein the first log-entry corresponds to a bug-overlay digital video effect (DVE) stored in a stunt switcher, and to a first start-time; (ii) selecting a second log-entry from the traffic log, wherein the second log-entry corresponds to a video component (VC) and to a second start-time, wherein the second start-time is later than the first start-time; (iii) causing the VC to start being channeled through the stunt switcher proximate the second start-time; (iv) determining a target time to run the bug-overlay DVE; and (v) causing the stunt switcher to run the stored bug-overlay DVE proximate the determined target time such that a bug is overlayed on the VC as the VC is being channeled through the stunt switcher.

20 Claims, 8 Drawing Sheets

(56) References Cited

U.S. PATENT DOCUMENTS

| | | |
|---|---|---|
| 2005/0229227 A1 | 10/2005 | Rogers |
| 2006/0143650 A1* | 6/2006 | Tanikawa .......... G06F 17/30787 725/38 |
| 2007/0067800 A1 | 3/2007 | Wachtfogel et al. |
| 2007/0143786 A1 | 6/2007 | Deitsch et al. |
| 2007/0162951 A1 | 7/2007 | Rashkovskiy et al. |
| 2007/0192788 A1 | 8/2007 | Danzl et al. |
| 2007/0261090 A1 | 11/2007 | Miller et al. |
| 2008/0010342 A1 | 1/2008 | Gebhardt et al. |
| 2008/0250447 A1 | 10/2008 | Rowe et al. |
| 2008/0250448 A1* | 10/2008 | Rowe .................... G06Q 30/02 725/32 |
| 2008/0276269 A1 | 11/2008 | Miller et al. |
| 2009/0070807 A1 | 3/2009 | Jacobs |
| 2009/0276805 A1 | 11/2009 | Andrews, II et al. |
| 2010/0166257 A1 | 7/2010 | Wredenhagen |
| 2011/0283311 A1 | 11/2011 | Luong |
| 2011/0321084 A1 | 12/2011 | Takahashi et al. |
| 2012/0084811 A1 | 4/2012 | Thompson et al. |
| 2012/0185905 A1 | 7/2012 | Kelley |
| 2012/0291067 A1 | 11/2012 | Wiles |
| 2013/0055306 A1* | 2/2013 | Macrae .............. G06Q 30/0241 725/32 |
| 2013/0272678 A1 | 10/2013 | Bryan et al. |
| 2014/0089966 A1 | 3/2014 | Briggs et al. |
| 2014/0195675 A1 | 7/2014 | Silver |
| 2014/0259051 A1 | 9/2014 | Strein et al. |
| 2014/0304367 A1 | 10/2014 | Fletcher |
| 2014/0317666 A1 | 10/2014 | Chiarulli et al. |
| 2014/0373044 A1 | 12/2014 | Carrol et al. |
| 2014/0380394 A1 | 12/2014 | Perron et al. |

OTHER PUBLICATIONS

SMTPE ST 2021-1:2012, "Broadcast Exchange Format (BFX)—Requirements and Informative Notes", Mar. 14, 2012.

SMTPE ST 2021-3:2012, "Broadcast Exchange Format (BFX)—Use Cases", Mar. 14, 2012.

SMTPE ST 2021-4:2012, "Broadcast Exchange Format (BFX)—Schema Documentation".

Non-Final Office Action dated Jan. 12, 2015 of U.S. Appl. No. 13/829,368, filed Mar. 14, 2013.

Hundemer, Hank J., U.S. Appl. No. 14/724,469, filed May 28, 2015, 41 pages.

Notice of Allowance dated May 8, 2015 of U.S. Appl. No. 13/828,939, filed Mar. 14, 2013.

Notice of Allowance dated Jul. 2, 2015 of U.S. Appl. No. 13/829,368, filed Mar. 14, 2013.

Office Action dated Jul. 31, 2015 of U.S. Appl. No. 13/828,632, filed Mar. 14, 2013.

Office Action dated Aug. 25, 2015 of U.S. Appl. No. 13/829,017, filed Mar. 14, 2013.

Advisory Action dated Sep. 24, 2014 of U.S. Appl. No. 13/828,682, filed Mar. 14, 2013.

Office Action dated Oct. 6, 2014 of U.S. Appl. No. 13/829,150, filed Mar. 14, 2013.

Hundemer, Hank J. U.S. Appl. No. 13/828,632, filed Mar. 14, 2013, 41 pages.

Hundemer, Hank J., U.S. Appl. No. 13/828,682, filed Mar. 14, 2013, 40 pages.

Hundemer, Hank J., U.S. Appl. No. 13/828,939, filed Mar. 14, 2013, 47 pages.

Hundemer, Hank J., U.S. Appl. No. 13/829,150, filed Mar. 14, 2013, 41 pages.

Hundemer, Hank J., U.S. Appl. No. 13/829,368, filed Mar. 14, 2013, 52 pages.

Non-final office action dated May 14, 2014 of U.S. Appl. No. 13/828,632, filed Mar. 14, 2013.

Non-final office action dated Mar. 7, 2014 of U.S. Appl. No. 13/828,682, filed Mar. 14, 2013.

Final office action dated Jun. 24, 2014 of U.S. Appl. No. 13/828,682, filed Mar. 14, 2013.

Notice of Allowance dated May 21, 2014 of U.S. Appl. No. 13/828,939, filed Mar. 14, 2013.

Non-final office action dated Jun. 26, 2014 of U.S. Appl. No. 13/829,150, filed Mar. 14, 2013.

Non-final office action dated Jul. 3, 2014 of U.S. Appl. No. 13/829,368, filed Mar. 14, 2013.

SMPTE Recommended Practice, "Implementing Broadcast Exchange Format (BXF)" RP 2021-9-2009, published Aug. 19, 2009, pp. 1-90.

Hundemer, Hank J., U.S. Appl. No. 13/829,017, filed Mar. 14, 2013, 45 pages.

Final Office Action dated Mar. 8, 2016 of U.S. Appl. No. 13/829,017, filed Mar. 14, 2013.

* cited by examiner

SYSTEMS AND METHODS FOR CAUSING A STUNT SWITCHER TO RUN A BUG-OVERLAY DVE WITH ABSOLUTE TIMING RESTRICTIONS

CROSS REFERENCES TO RELATED DISCLOSURES

This disclosure is a continuation of U.S. patent application Ser. No. 13/828,939 filed Mar. 14, 2013, which is hereby incorporated by reference herein in its entirety.

This disclosure relates to U.S. patent application Ser. No. 13/828,682, entitled "Systems and Methods for Causing a Stunt Switcher to Run a DVE," U.S. patent application Ser. No. 13/829,150, entitled "Systems and Methods for Causing a Stunt Switcher to Run a Bug-Overlay DVE," U.S. patent application Ser. No. 13/828,632, entitled "Systems and Methods for Causing a Stunt Switcher to Run a Bug-Removal DVE," U.S. patent application Ser. No. 13/829,368, entitled "Systems and Methods for Causing a Stunt Switcher to Run a Snipe-Overlay DVE," and U.S. patent application Ser. No. 13/829,017, entitled "Systems and Methods for Causing a Stunt Switcher to Run a Multi-Video-Source DVE," all of which were filed on Mar. 14, 2013, are commonly assigned to the assignee of the present disclosure, and are hereby incorporated by reference herein in their entirety.

USAGE AND TERMINOLOGY

Throughout this disclosure, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

the term "video" refers to any material represented in a video format (i.e., having multiple frames). In some instances, video may include multiple sequential frames that are identical or nearly identical, and that may give the impression of a still image. Video may or may not include an audio portion.

the term "video component" (VC) refers to video that one of ordinary skill in the art would typically consider to be self-contained, and that is typically separately scheduled by a traffic system (also referred to as a scheduling-and-sequencing system) of a television-broadcasting system.

TECHNICAL FIELD

The disclosed systems and methods relate generally to television-broadcasting technology.

BACKGROUND

A television-broadcasting system typically includes a traffic system that performs functions related to broadcast scheduling. For example, the traffic system may facilitate the creation of a traffic-log ("log"), which is a broadcast schedule for a given station during a given time period. The log may include multiple ordered log entries, each of which may correspond to a VC. Each log entry may also include scheduling data for the video, and therefore the log may generally represent the scheduled sequence of VCs intended to be broadcast during the corresponding time period.

There are several types of VCs, non-limiting examples of which include a show-segment VC, a commercial VC, and a promotion VC. A show-segment VC consists of at least a portion of a show, and potentially one or more commercials. A show may be, for example, an episode of a sitcom, a news program, or a movie. A commercial VC consists of a single commercial. Typically, a television-broadcasting company broadcasts a commercial VC in exchange for payment or other compensation from the provider of the commercial VC. A promotion VC consists of video that promotes something such as an event or another VC. Unlike a commercial VC, the television-broadcasting company typically does not receive a payment or other compensation from a third-party for broadcasting the promotion VC.

The traffic system may communicate with a master control system (MCS), which is the technical hub of a television-broadcasting system and is typically the final point before video is sent to an air-chain system for broadcast. More specifically, the traffic system typically communicates with an automation system of the MCS. The automation system is the logic center of the MCS and may cause the MCS and/or another entity to perform various functions.

Through a communication path, the traffic system may provide the log to the automation system, such that the automation system may traverse and select log entries. The automation system may then cause the MCS and/or another entity to perform certain functions for each selected log-entry at an appropriate time (i.e., based on the corresponding scheduling data). For example, the automation system may cause a recording-and-playout device (RAPD) to retrieve and playout a stored VC such that it may be channeled through one or more entities within the MCS (e.g., routers and switchers), and sent to an air-chain system for broadcast. In another example, the automation system may cause a streaming VC received from a streaming-video source (SVS) to be channeled through the MCS and sent to the air-chain system for broadcast.

In some instances, when video is channeled through the MCS, the video may be channeled through a stunt switcher of the MCS. The stunt switcher performs functions related to digital video effects (DVE) (sometimes referred to as "stunt work"). For example, the stunt switcher may run a DVE, which dynamically manipulates video that is being channeled through the stunt switcher.

SUMMARY

In one aspect, a non-transitory computer-readable medium is disclosed. The medium includes a set of program instructions that when executed by a processor cause performance of a set of functions. The functions include: (i) selecting a first log-entry from a traffic log, wherein the first log-entry corresponds to a bug-overlay DVE stored in a stunt switcher, and to a first start-time; (ii) selecting a second log-entry from the traffic log, wherein the second log-entry corresponds to a VC and to a second start-time, wherein the second start-time is later than the first start-time; (iii) causing the VC to start being channeled through the stunt switcher proximate the second start-time; (iv) determining a target time to run the bug-overlay DVE; and (v) causing the stunt switcher to run the stored bug-overlay DVE proximate the determined target time such that a bug is overlayed on the VC as the VC is being channeled through the stunt switcher.

In another aspect, another non-transitory computer-readable medium is disclosed. The medium includes a set of program instructions that when executed by a processor cause performance of a set of functions. The functions include: (i) selecting a first log-entry from a traffic log, wherein the first log-entry corresponds to a bug-overlay DVE stored in a stunt switcher, and to a first start-time; (ii) selecting a second log-entry from the traffic log, wherein the second log-entry corresponds to a VC and to a second start-time, wherein the second start-time is later than the first start-time; (iii) causing the VC to start being channeled through the stunt switcher proximate the second start-time; (iv) determining a target time to run the bug-overlay DVE; (v) proximate the determined target time, (a) storing a DVE state of the stunt switcher, (b) causing the stunt switcher to run a first key-reset DVE, and (c) causing the stunt switcher to run the stored bug-overlay DVE such that a bug is overlayed on the VC as the VC is being channeled through the stunt switcher; (vi) making a determination that the bug-overlay DVE has completed running; and (vii) responsive to making the determination that the bug-overlay DVE has completed running, (a) causing the stunt switcher to run a second key-reset DVE, and (b) restoring the DVE state of the stunt switcher with the stored DVE state.

In another aspect, a television-broadcasting system is disclosed. The system includes a stunt switcher and an automation system having a computer-readable medium including a set of program instructions that when executed by the automation system cause the automation system to perform a set of functions. The functions include: (i) selecting a first log-entry from a traffic log, wherein the first log-entry corresponds to a bug-overlay DVE stored in the stunt switcher, and to a first start-time; (ii) selecting a second log-entry from the traffic log, wherein the second log-entry corresponds to a VC and to a second start-time, wherein the second start-time is later than the first start-time; (iii) causing the VC to start being channeled through the stunt switcher proximate the second start-time; (iv) determining a target time to run the bug-overlay DVE; (v) proximate the determined target time, (a) storing a DVE state of the stunt switcher, (b) causing the stunt switcher to run a first key-reset DVE, and (vi) causing the stunt switcher to run the stored bug-overlay DVE such that a bug is overlayed on the VC as the VC is being channeled through the stunt switcher; (vi) making a determination that the bug-overlay DVE has completed running; and (vii) responsive to making the determination that the bug-overlay DVE has completed running, (i) causing the stunt switcher to run a second key-reset DVE, and (ii) restoring the DVE state of the stunt switcher with the stored DVE state.

DETAILED DESCRIPTION OF THE DRAWINGS

I. Overview

Figure 1:
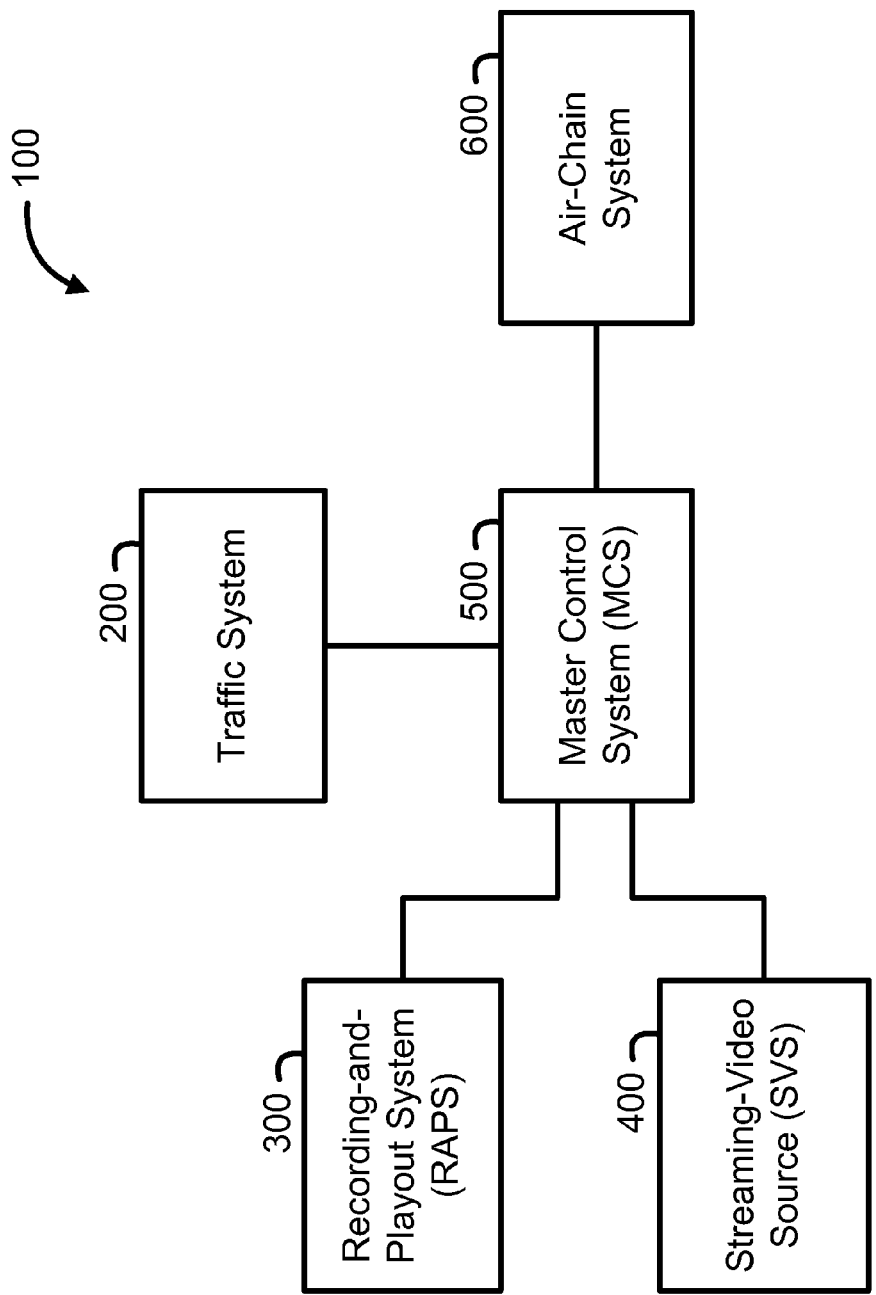
FIG. 1 is a simplified block diagram of an example television-broadcast system.

In the television-broadcasting industry, traffic systems are provided by multiple vendors and often include distinguishing features. However, for a variety of reasons such as to provide compatibility, many traffic systems create logs according to a general industry-wide standard. Likewise, many automation systems are configured to receive and process logs based on this standard. A log entry based on this standard may include certain attributes, including for example a house identifier, a source identifier, a start time, a duration, an episode number, a segment number, and/or an one or more auxiliary notations. These attributes may be generated automatically (e.g., by the traffic system) or may be provided by a user such as a traffic manager.

Typically, a log entry includes one of either a house identifier or a source identifier. If the log entry corresponds to a stored VC, the log entry typically includes a house identifier (sometimes called a "house number"), which identifies the VC. Typically, the house identifier is a unique identifier within a given television-broadcasting system, and maps to a file location in a data storage where the VC is stored. As such, by obtaining the house identifier of a log entry, the automation system may use a mapping table to determine the appropriate file location, and may then retrieve the VC that is stored in that file location. Alternatively, if the log entry corresponds to a streaming VC, the log entry may include a source identifier, which identifies an SVS (e.g., via a mapping table) that provides the streaming VC The start time may indicate the intended start time of a corresponding VC. The start time may be represented as an absolute start time or as a calculated start time. A calculated start time indicates that the start time is when the preceding log entry gets "completed" (i.e., when the VC of the previous log entry has played for its corresponding duration). In some instances, the start time may be unknown until it occurs, and therefore the start time may be represented as a manual start time. In such instances, the corresponding VC is not started until a request is received from a user or a device. The duration indicates the duration of the corresponding VC. In some instances, the duration may be unknown and therefore it may not be included in the log entry. The episode number identifies a particular episode of a show, and the segment number identifies a particular segment number of a show. The episode number and the segment number are included in a log entry that corresponds to a show-segment VC. The one or more auxiliary notations are typically notes that are reviewed by a user (e.g., a traffic manager may provide a note to a master control operator about the corresponding log entry).

The above-described attributes may be stored in corresponding fields in the log entry. For example, the house identifier may be stored in a house-identifier field and the one or more auxiliary notations may be stored in one or more auxiliary-notation fields. Two examples of well-known traffic systems that use the attributes as described above include WO Traffic provided by WideOrbit Inc. of San Francisco, Calif., and OSi-Traffic™ provided by Harris Corporation of Melbourne, Fla.

As discussed above, after an automation system selects a log entry, the automation system may channel the corresponding VC through a stunt switcher, at which time the stunt switcher may run a DVE to dynamically manipulate the video. Running the DVE in this manner typically occurs in response to a user submitting a request to the stunt switcher via a user interface of the stunt switcher.

Submitting such a request to the stunt switcher may be a time-sensitive event. For example, consider a particular type of DVE, namely a bug-overlay DVE. A bug-overlay DVE is a DVE that is configured to overlay a graphic or short video on video. For example, a bug-overlay DVE may be configured to overlay a small graphic that includes the current time and temperature on the lower right-hand corner of the video. In some instances, it may be desired to overlay such a graphic only at certain "absolute" times, such as at fifteen minutes before and after the top of each hour to adhere to common industry conventions. Therefore, in one example, approximately fifteen minutes before and after the top of each hour, a user may submit a request to the stunt switcher to run the bug-overlay DVE.

Among other things, this process is manually intensive and is prone to error as it requires a user to constantly monitor the log and the current time to determine when a bug-overlay DVE should be run before submitting an appropriate request to the stunt switcher. The disclosed systems and methods improve upon this process by configuring a log entry such that the log entry may trigger the running of a bug-overlay DVE at an appropriate time (i.e., in view of any absolute timing restrictions), such as at around fifteen minutes after the top of the hour. Accordingly, a user such as a traffic manager may use a log as a mechanism for scheduling bug-overlay DVEs.

In one example, a log entry includes an identifier that maps to a set of scripts that, when executed, cause an automation system to cause a stunt switcher to run a bug-overlay DVE. Further, the identifier may be stored in the house-identifier field of the log entry, such that it may be "disguised" as a house identifier as described above. Among other things, this allows the disclosed systems and methods to provide the above-described functionality while adhering to protocols used by many existing traffic systems such as those identified above.

II. Example Television-Broadcasting System

FIG. 1 shows an example television-broadcasting system, generally designated 100. The television-broadcast system 100 may be configured to perform a variety of functions that relate to television broadcasting. The television-broadcasting system 100 may include a traffic system 200, a recording-and-playout system (RAPS) 300, an SVS 400, a MCS 500, and an air-chain system 600. The MCS 500 may serve as the hub of the television-broadcasting system 100 and may connect to each of the traffic system 200, the RAPS 300, the SVS 400, and the air-chain system 600. Generally, the television-broadcasting system 100 may be configured such that video may be sent from the RAPS 300, the SVS 400, or another source, through the MCS 500, and to the air-chain system 600 for broadcast.

A. Traffic System

Figure 2:
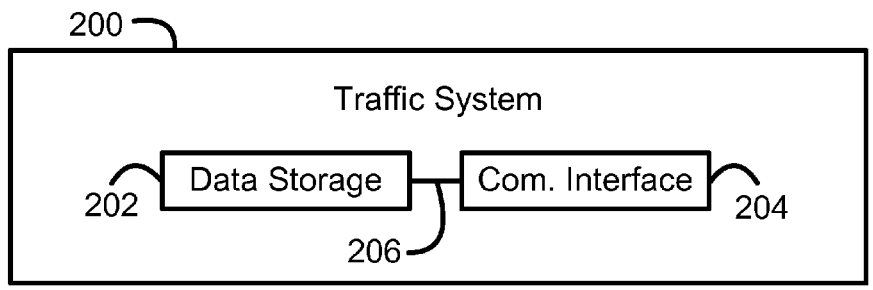
FIG. 2 is a simplified block diagram of an example traffic system.

FIG. 2 shows the traffic system 200 in greater detail. The traffic system 200 may be configured for creating and sending a log to the MCS 500, and may include a data storage 202 and a communication interface 204, both of which may be connected to each other via a connection mechanism (e.g., a bus) 206. The traffic system 200 may be configured to store logs in the data storage 202, and to send the stored logs, via the communication interface 204, to the MCS 500. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
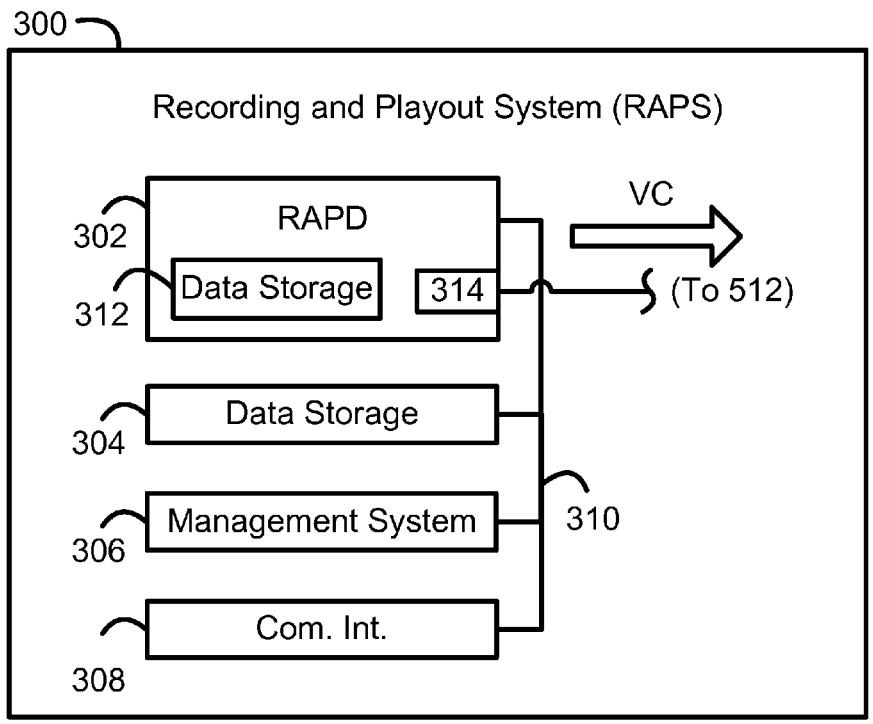
FIG. 3 is a simplified block diagram of an example recording-and-playout system.

FIG. 3 shows the RAPS 300 in greater detail. The RAPS 300 may be configured to record and playout VCs for use by the MCS 500, and may include a recording-and-playout device (RAPD) 302, a data storage 304, a management system 306, and a communication interface 308, each of which may be connected to each other via a connection mechanism 310.

The RAPD 302 may be configured to record VCs (e.g., a VC retrieved from the data storage 304) and playout (i.e. send) VCs, via the MCS 500, to the air-chain system 600. The RAPD 302 may include a data storage 312 and an output 314, both of which may be connected to each other by a connection mechanism (not shown). The data storage 312 may be used for storing VCs that may be sent via the output 314. The management system 306 may be configured to manage the RAPD 302 by organizing and moving VCs back-and-forth between the RAPD and the data storage 304. The communication interface 308 may connect the RAPS 300 to the MCS 500 or to another entity. An example of a RAPD is the K2 server provided by Grass Valley™ of San Francisco, Calif.

C. SVS

Figure 4:
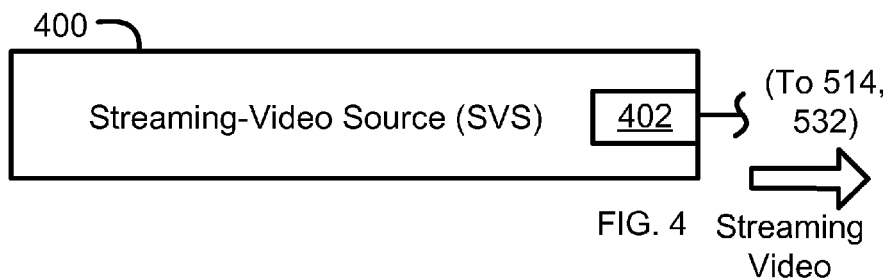
FIG. 4 is a simplified block diagram of an example streaming-video source.

FIG. 4 shows the SVS 400 in greater detail. The SVS 400 is a source configured to send streaming video (e.g., a streaming VC) via an output 402. Streaming video is often received at or shortly before the time when the video is broadcast. In one example, the SVS 400 may send streaming video based on the high-definition serial digital interface (HD-SDI) standard with a data transfer rate of 1.485 Gbps. An example of an SVS is a satellite (e.g., that streams so-called "network television" video) or a newsroom production control system.

D. MCS

Figure 5:
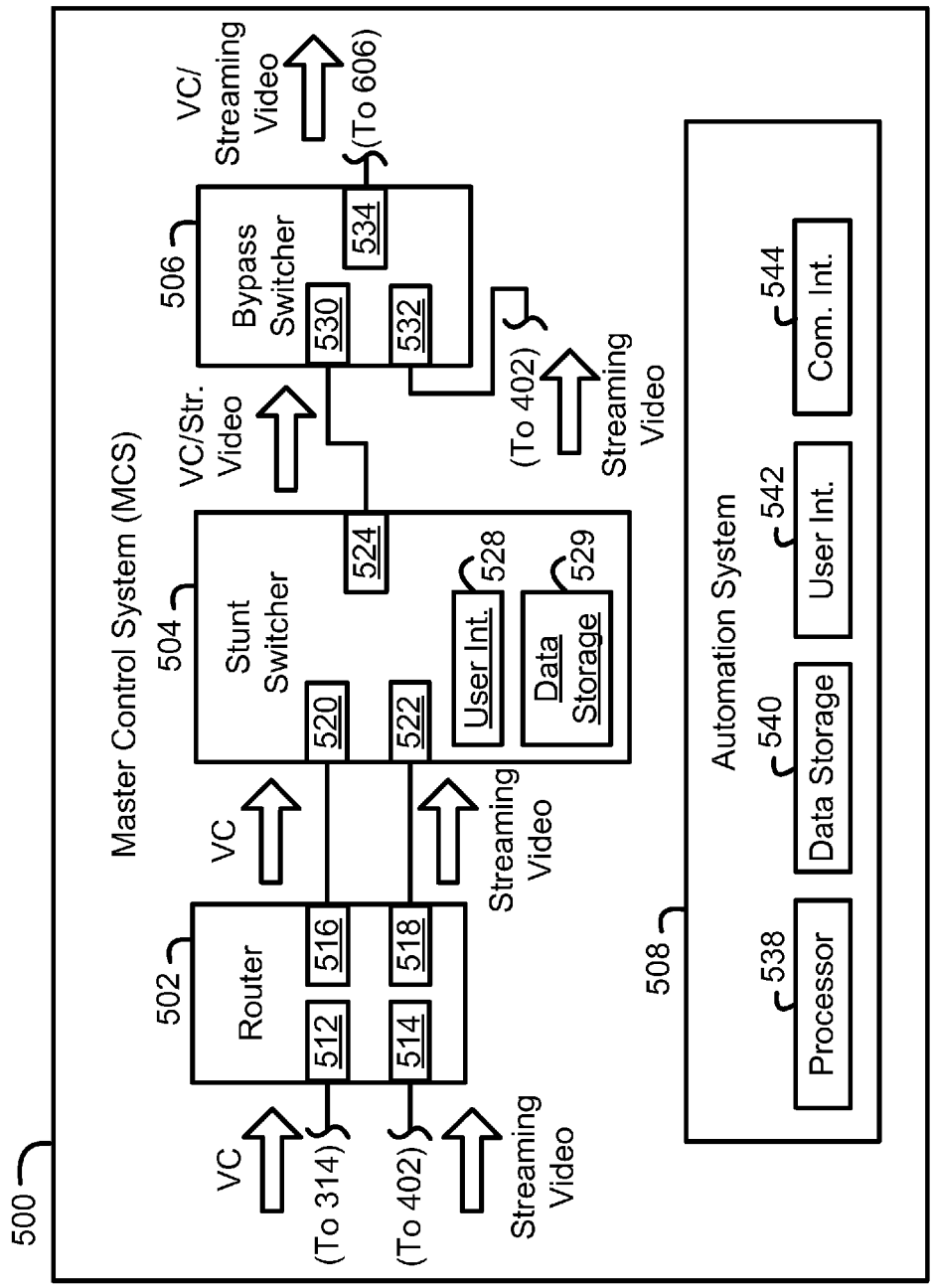
FIG. 5 is a simplified block diagram of an example master control system.

FIG. 5 shows the MCS 500 in greater detail. The MCS 500 may be configured to receive video, channel the video through one or more sources, and send the video to the air-chain system 600 for broadcast. In one example, the MCS 500 includes a router 502, a stunt switcher 504, a bypass switcher 506, and an automation system 508, each of which may be connected to each other by a connection mechanism (not shown)

1. Router

The router 502 may be configured to channel video by mapping inputs to outputs, and may include one or more inputs, including for example, a first input 512 and a second input 514, and one or more outputs, including for example, a first output 516 and a second output 518. The router 502 may also include a communication interface (not shown). The inputs 512, 514, the outputs 516, 518, and the communication interface may each be connected to each other by a connection mechanism (not shown). Notably, a router may and often does have more inputs than outputs such that it may connect many sources to relatively fewer destinations.

The RAPD 302 may be connected to the router 502 via the output 314 and the input 512. The SVS 400 may be connected to the router 502 via the output 402 and the input 514. An example of a router is the Blackmagic Design Videohub provided by Blackmagic Design Pty. Ltd. Of Fremont, Calif.

2. Stunt Switcher

The stunt switcher 504 may be configured to channel video by mapping inputs to outputs, and may include one or more inputs, including, for example, a first input 520 and a second input 522, and one or more outputs, including, for example, an output 524. The stunt switcher 504 may also include a user interface 528, a data storage 529, and a communication interface (not shown).

The inputs 520, 522, the output 524, the user interface 528, the data storage 529, and the communication interface may each be connected to each other by a connection mechanism (not shown). The router 502 may be connected to the stunt switcher 504 via the output 516 and the input 520. The router 502 may also be connected to the stunt switcher 504 via the output 518 and the input 522. Like a router, a stunt switcher may and often does have more inputs than outputs such that it may connect many sources to relatively fewer destinations. An example of a stunt switcher is the Miranda NVISION NVS5100MC provided by NVision, Inc. of Coppell, Tex.

The stunt switcher 504 may further be configured to perform various functions related to DVEs. A DVE is an effect module (e.g., in the form of a set of program instructions) that is configured to be executed or "run." When run, a DVE dynamically manipulates video being channeled through the stunt switcher. Running a DVE may involve using one or more layers known as "keys" to overlay graphics, video, or other media on video. In some instances, running a DVE may involve simply "resetting" the keys, thereby removing any media being overlayed as a result of another DVE being run.

The stunt switcher 504 may be configured to assist a user in designing a DVE, such as via the user interface 528. Once a DVE is designed, the stunt switcher 504 may store the DVE in the data storage 529. In one example, the stunt switcher may store DVEs in respective DVE registers within the data storage 529. The stunt switcher 504 may also store media used in connection with the DVE in the data storage 529. This allows the stunt switcher 504 to retrieve media as needed. For example, when running a DVE, the stunt switcher 504 may retrieve media from a particular graphic or video register in the data storage 529 as indicated by the DVE. Media may be stored in the data storage 529 in a variety of manners, such as via a file transfer protocol (FTP). As such, by overwriting media stored in the data storage 529, the result of a DVE that is run may be changed.

Once a DVE is designed and stored in the data storage 529, the stunt switcher 504 may then retrieve and run the DVE. In some instances, this may occur in response to a request being received from a user (e.g., via the user interface 528) or from the automation system 508. Accordingly, when a stunt switcher runs a DVE, a VC that is being channeled through the stunt switcher 504 may be dynamically manipulated. This manipulated video may then be sent through the bypass switcher 506 and to the air-chain system 600 for broadcast as described in greater detail below.

As noted above, one example type of DVE is a bug-overlay DVE. A bug-overlay DVE is a DVE that is configured to overlay a graphic or video (referred to herein as a "bug") on video as it is channeled through the stunt switcher 504. For example, a bug-overlay DVE may be configured to (when run) overlay a graphic (referred to herein as a "bug graphic") such as a small "ch. 9" graphic or other station logo graphic on the lower right-hand corner of the video. As another example, a bug-overlay DVE may be configured to (when run) overlay a short-duration video (referred to herein as a "bug video") on the lower right-hand corner of the video. A bug-video is typically less than five seconds and is typically configured to be played in a looping fashion. As such, the bug video may have a last frame that smoothly transitions into the first frame. This may create the illusion of a continuously "moving" bug graphic (e.g., a spinning station logo graphic) being overlayed on video. In some instances, a bug may be partially transparent such that it does not completely block the underlying video. This is sometimes referred to as a ghost bug.

A bug may also include data that the stunt switcher 504 receives from a character generator connected to the stunt switcher. For example, the bug may include time and/or temperature data that is received from the character generator, and therefore the bug that is overlayed on video may include the time and/or temperature data (e.g., together with a graphic or video). Since the character generator may continually provide updated data, this configuration may allow the bug to have a "real-time" feel from the perspective of someone viewing the bug as it is being overlayed on video.

Another example type of DVE is a key-reset DVE. A key-reset DVE is configured to (when run) "reset" one or more keys in the stunt switcher 504 such that no overlaying media or other effects remain on those corresponding keys. In some instances, a key-reset DVE may reset all keys. However, in other instances, only a particular key may be reset. For example, if a key-reset DVE is intended to remove a bug that is known to be on a particular key, only that particular key may be reset. This particular example of a key-reset DVE may be referred to herein as a bug-removal DVE.

3. Bypass Switcher

The bypass switcher 506 may be configured to channel video by mapping inputs to outputs. The bypass switcher 506 may include at least one input including, for example, a first input 530 and a second input 532, and at least one output including, for example, an output 534. The bypass switcher 506 may also include a communication interface (not shown). The inputs 530, 532, the output 534, and the communication interface may all be connected to each other by a connection mechanism (not shown). The stunt switcher 504 may be connected to the bypass switcher 506 via the output 524 and the input 530. A bypass switcher may and often does have multiple inputs and a single output such that it may connect many sources to relatively fewer destinations.

Accordingly, provided that the router 502, the stunt switcher 504, and the bypass switcher 506 all have the appropriate input-to-output mappings, a VC sent from the RAPD 302 to the MCS 500 may be channeled through the entities in the MCS and sent out the MCS. Likewise, provided that the router 502, the stunt switcher 504, and the bypass switcher 506 all have the appropriate input-to-output mappings, streaming video sent from the SVS 400 to the MCS 500 may be channeled through the entities in the MCS and sent out the MCS.

In some instances, a source (e.g., the SVS 400) may be connected to the bypass switcher 506 (e.g., via the output 402 and the input 532). A distribution amplifier (not shown) may be used to split the output of the SVS 400 such that it may be sent to both the router 502 and the bypass switcher 506. This configuration may provide for a back-up solution in the event that a device such as the router 502 or stunt switcher 504 malfunctions. If such an event occurs while using this configuration, a master control operator may simply change the input-to-output mappings on the bypass switcher 506 to cause the source to send video to the air-chain system 600 for broadcast.

4. Automation System

The automation system 508 may be configured to perform or to cause performance of one or more functions related to the television-broadcasting system 100. The automation system 508 may include a processor 538, a data storage 540, a user-interface 542 (e.g., including a display device), and a communication interface 544, all of which may be connected by a connection mechanism (not shown). The processor 538 may include one or more general-purpose processors (e.g., microprocessors) and/or special-purpose processors (e.g., digital signal processors and/or application specific integrated circuits).

The data storage 550 may include one or more volatile and/or non-volatile storage components and may be integrated in whole or in part with the processor 538. The data storage 450 may take the form of a non-transitory computer-readable medium and may include a set of program instructions, that when executed by the automation system 508 (e.g., by the processor 538), cause performance of a set of functions. For example, the automation system 508 may cause the RAPS 300, the SVS 400, the MCS 500, the air-chain system 600, an entity included therein, and/or another entity to perform one of more of the functions described in this disclosure. The automation system 508 may cause such functions to be performed by sending instructions and/or other data via a corresponding communication interface and/or connection mechanism to the appropriate device.

The automation system 508 may receive data via the same path. In one example, the automation system 508 sends and receives data according to a video disk control protocol (VDCP). For example, the automation system 508 may receive from the bypass switcher 506, an indication of the input-to-output mappings used by the bypass switcher such that the automation system may determine whether the scheduled video was actually sent to the air-chain system for broadcast. The automation system 508 may use these indications to generate an as-run log, which is a report of what was actually broadcast.

In some instances, the automation system 508 may perform functions described herein as being performed by the traffic system 200. Likewise, in some instances, the traffic system 200 may perform functions described herein as being performed by the automation system 508. This may be the case, for example, where the traffic system 200 and the automation system 508 operate using a "live log" approach, where the traffic system 200 may be configured to query the automation system 508, manage the log and make scheduling-related decisions itself, and provide log entries (perhaps one at a time) to the automation system for processing.

E. Air-Chain System

Figure 6:
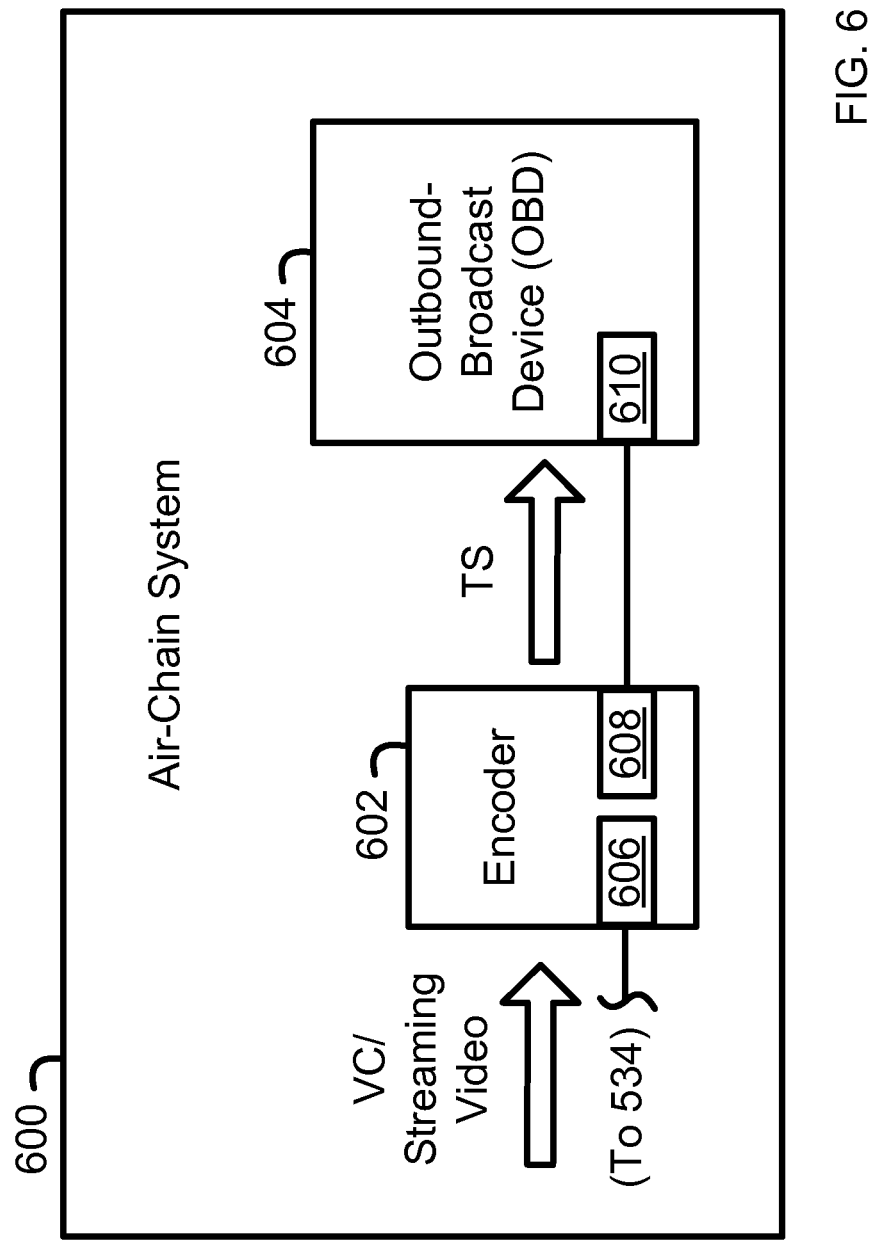
FIG. 6 is a simplified block diagram of an example air-chain system.

FIG. 6 shows the air-chain system 600 in greater detail. The air-chain system 600 may be configured to prepare and broadcast video received from the MCS 500 to an audience. The air-chain system 600 may include an encoder 602 and an outbound-broadcast device (OBD) 604.

The encoder 602 may be configured to receive video from a source entity, generate a transport stream (TS) (that includes the video), and send the generated TS to a destination entity. The TS may be described as including video, meaning that the TS includes the encoded representation of the video, among other things. The encoder 602 may include an input 606 and an output 608, each of which may be connected by a connection mechanism (not shown). The bypass switcher 506 may be connected to the encoder 602 via the output 534 and the input 606.

In one example, the encoder 602 may generate a TS by, among other things, encoding video based on the HD-SDI standard to video based on the MPEG 2 standard. An example of an encoder is the NetVX provided by Harris Corporation of Melbourne, Fla.

The OBD 604 may be configured to receive a TS from a source entity, and broadcast the TS (i.e., including video) to multiple destination entities for viewing by an audience. The OBD 604 may include an input 610, and the encoder 602 may be connected to the OBD via the output 608 and the input 610.

It should be noted that the term television-broadcast as used in this disclosure refers broadly to the distribution of video to an audience, and is not meant to be limited to distribution of video in any particular manner. Accordingly, the OBD 604 may take the form of a transmitter, satellite, or terrestrial fiber transmitter (e.g., any of which may correspond with a service provider). As another example, the OBD 604 may also take the form of a network connection (e.g., for broadcasting the TS to an audience via the Internet).

The television-broadcasting system 100 described above is one non-limiting example. Indeed, the disclosed systems may include some or all of the entities discussed above, and may be arranged in different ways as would be apparent to one of ordinary skill in the art.

III. Example Methods

Figure 7A:
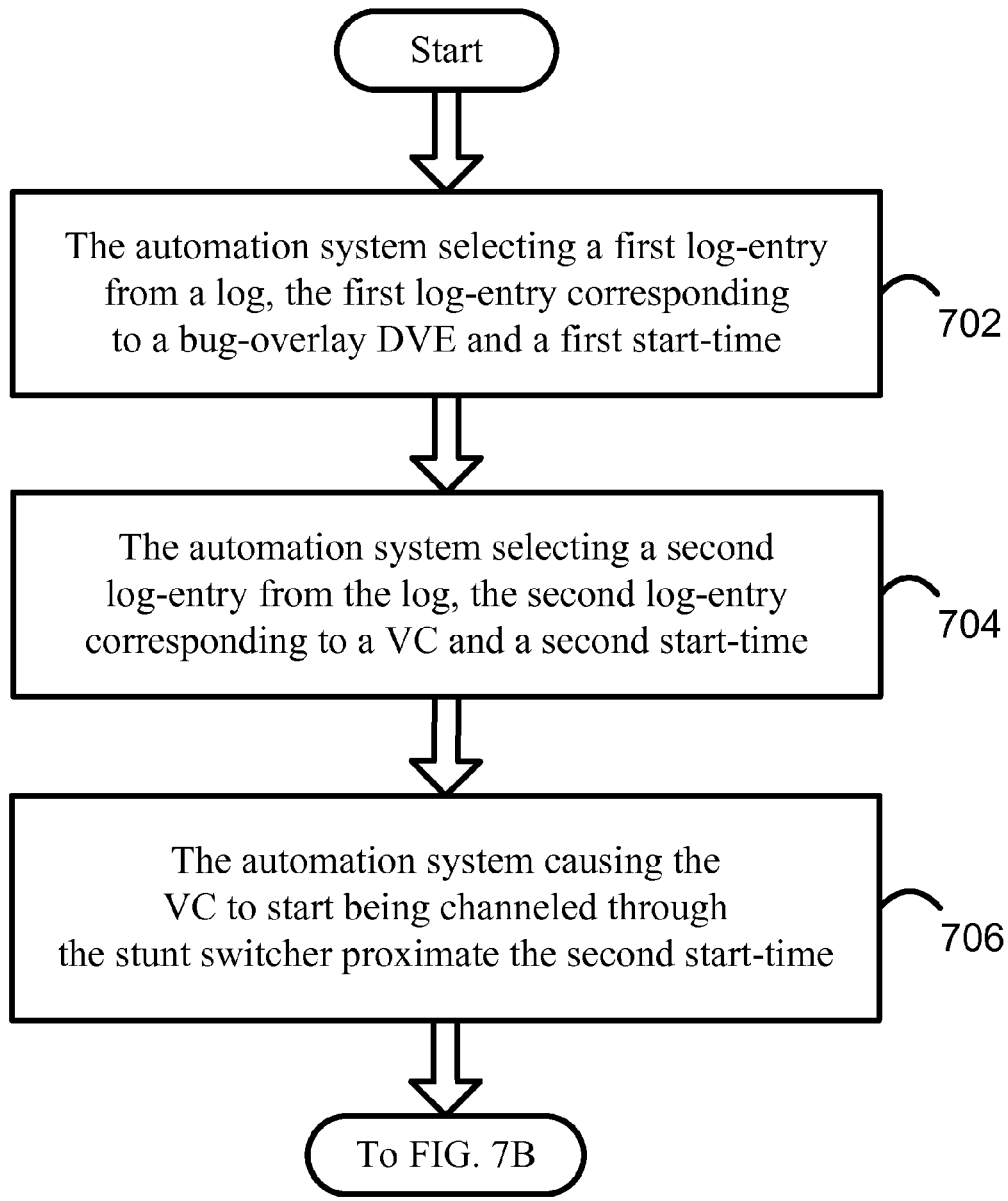
FIG. 7A shows a first part of a flow chart illustrating functions in accordance with an example method.
Figure 7B:
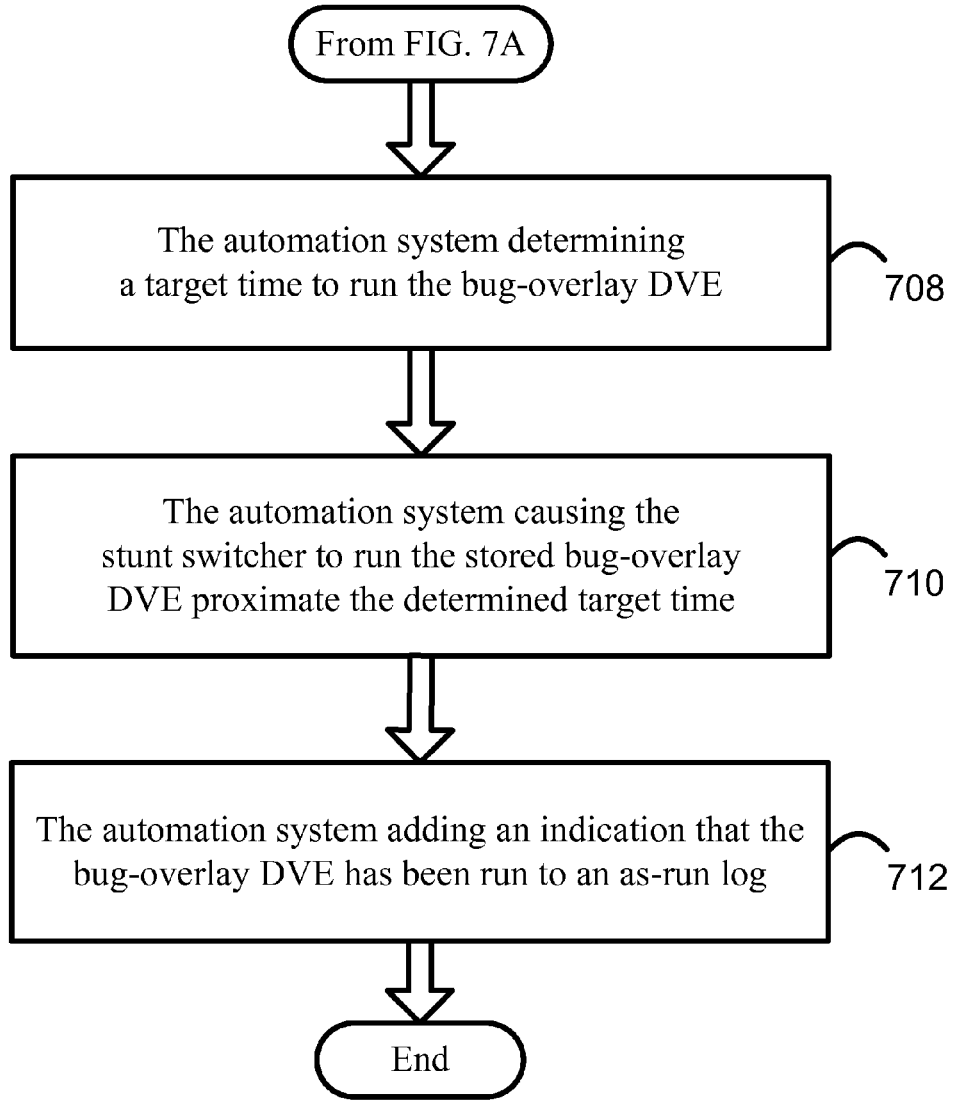
FIG. 7B shows a second part of the flow chart of FIG. 7A.

FIGS. 7A and 7B show a flow chart illustrating functions in accordance with an example method. At block 702, the method may involve the automation system 508 selecting (i.e., retrieving or accessing) a first log-entry from a log. Unlike a typical log-entry that corresponds to a VC, the first log-entry corresponds to a bug-overlay DVE that is stored in the data storage 529 of the stunt switcher 504. Note that for a stored bug-overlay DVE, the corresponding bug that is overlayed (or a portion thereof) may also be stored in the data storage 529. An example manner in which the first log-entry may correspond to the bug-overlay DVE is described in greater detail below. The first log-entry may also correspond to a first start-time (e.g., as represented by an absolute, calculated or manual start time stored in a start time-field of the first log-entry).

The automation system 508 may select the first log-entry according to the corresponding first start-time. For example, if the first log-entry includes a first start-time represented as an absolute start time, the automation system 508 may select the first log-entry at the absolute start time (e.g., when a current time matches the absolute start time). As another example, if the first log-entry includes a first start-time represented as a calculated start time, the automation system 508 may select the first log-entry when the preceding log entry gets "completed" (i.e., when the VC of the previous log entry has played for its corresponding duration). Notably, in some instances the automation system 508 may select the first log-entry "ahead of schedule" (e.g., three hours before the first start-time). This may allow the automation system 508 and/or another entity to perform or prepare to perform certain functions in advance of the start time.

In one example, the first start-time is the top of an hour (5:00 pm, 6:00 pm, etc.). This may be the case in instances where a bug-overlay DVE is intended to be run at (or near) one or more absolute times within the corresponding hour (e.g., at fifteen minutes after the top of the hour) as described in greater details below.

The first log-entry may also include a duration (e.g., in a duration field of the first log-entry). However, since the first log-entry does not correspond to a VC, but rather to a bug-overlay DVE, the first log-entry may include a zero duration. As a result, the automation system 508 does not "pause" on the first log-entry when traversing the log (as it would for a log-entry that corresponds to a VC). In some instances, a traffic system may be configured to prevent use of a log entry having a zero duration. In such instances, it may be desired to configure the first log-entry with a nominal duration (e.g., one second) such that the traffic system deems the first log-entry acceptable.

At block 704, the method may involve the automation system 508 selecting a second log-entry from the traffic log. The second log-entry may correspond to a VC. In one example, the second log-entry includes a house identifier (e.g., stored in a house-identifier field of the log entry) that maps to the VC. The automation system 508 may select the second log-entry in a manner similar to that of the first log-entry.

The second log-entry may correspond to a second start-time that is later than the first start-time, and therefore the first and second log-entries may be non-adjacent in the log. As such, there may be one or more interviewing log entries (e.g., corresponding to other VCs) between the first and second log entries. The second log entry may also include a duration. The duration indicates the duration of the VC, and therefore the duration is a non-zero duration. This results in the automation system 508 "pausing" on the second log-entry for the duration of the VC (e.g., for the duration of the VC as recorded in the RAPD 302). Likewise, the automation system 508 would pause on any log entries having a non-zero duration that are positioned between the first and second log entries.

At block 706, the method may involve the automation system 508 causing the VC to start being channeled through the stunt switcher 504 proximate (i.e., at or near) the second start-time. For example, the automation system 508 may cause the RAPD 302 to retrieve the VC, channel it through the MCS 500 (and the included stunt switcher 504) and send it to the air-chain system 600 for broadcast. Since the RAPD retrieving the VC may take a few seconds, the automation system 508 may begin performing the related functions in advance of the second start-time such that the VC is channeled through the stunt switcher 504 proximate the second start-time.

At block 708, the method may involve the automation system 508 determining a target time to run the bug-overlay DVE. At block 710, the method may involve the automation system 508 causing the stunt switcher 504 to run the stored bug-overlay DVE proximate the determined target time. As a result, the automation system 508 may overlay a bug on the VC at the determined target time as the VC is being channeled through the stunt switcher 504. As such, the second log-entry may cause the VC to be broadcast, and the first log-entry may cause a bug-overlay DVE to be run that dynamically manipulates the VC as the VC is being broadcast.

The target time may therefore dictate when the bug-overlay DVE is run, and may be set (e.g., by a user) as desired. For example, by setting the target time as fifteen minutes, in the example where the first start-time is the top of an hour, the automation system 508 may cause the stunt switcher 504 to run the bug-overlay DVE fifteen minutes after the top of the hour (which occurs while the VC corresponding to the second log-entry is being broadcast). This technique may be particular useful in connection with certain types of bug-overlay DVEs. For example, where the bug-overlay DVE is configured to overlay a bug with time and/or temperature data, it may be desired to overlay such a bug around fifteen minutes after and before each hour, such as to adhere to common industry conventions. Accordingly, the determined target time may be within a range of thirteen minutes after the top of the hour and seventeen minutes after the top of the hour, or within a range of forty-three minutes after the top of the hour and forty-seven minutes after the top of the hour.

As another example, where the bug-overlay DVE is configured to overlay a bug that identifies a station's "call letters," it may be desired to overlay the bug around the top of each house to adhere to industry regulations and/or common industry conventions. Accordingly, the determined target time may be within a range of three minutes before the top of the hour and three minutes after the top of the hour. In such instances, the first log-entry (i.e., corresponding to the bug-overlay DVE), may be have a start time before the top of the hour.

In some instances, it may be desired to overlay a bug only during a show portion of a show-segment VC (i.e., and not during a barter-VC portion of a show-segment VC, nor during a commercial VC). Accordingly, the determined target time may be a closest time to a predetermined absolute time (e.g., fifteen minutes after the top of the hour) as possible while also corresponding to a show portion of a show-segment VC. Example techniques for determining the type of a given VC are described in U.S. patent application Ser. No. 13/629,497 entitled "Systems and Methods for Electronically Tagging a Video Component In a Video Package."

In one example, the automation system 508 causing the stunt switcher 504 to run the bug-overlay DVE may involve the automation system sending a request to the stunt switcher 504 to run the bug-overlay DVE (according to a protocol understood by the stunt switcher). In some instances, a parameter may be included in the first log-entry (e.g., in the one or more auxiliary-notation fields) that may be used to identify and/or configure the bug-overlay DVE.

Further, it may be desired to track when the bug has been overlayed on video. This may be particularly useful in connection with certain types of bugs, namely ones that involve advertisements (e.g., a sponsor for the time and/or temperature data) that may be need to be tracked for billing purposes. As such, at block 712, the method may involve the automation system 508 adding an indication that the bug-overlay DVE has been run to an as-run log. In one example, the automation system 508 may further indicate how long the particular bug was overlayed on video being broadcast, and/or the particular time when the overlaying occurred.

Figure 8A:
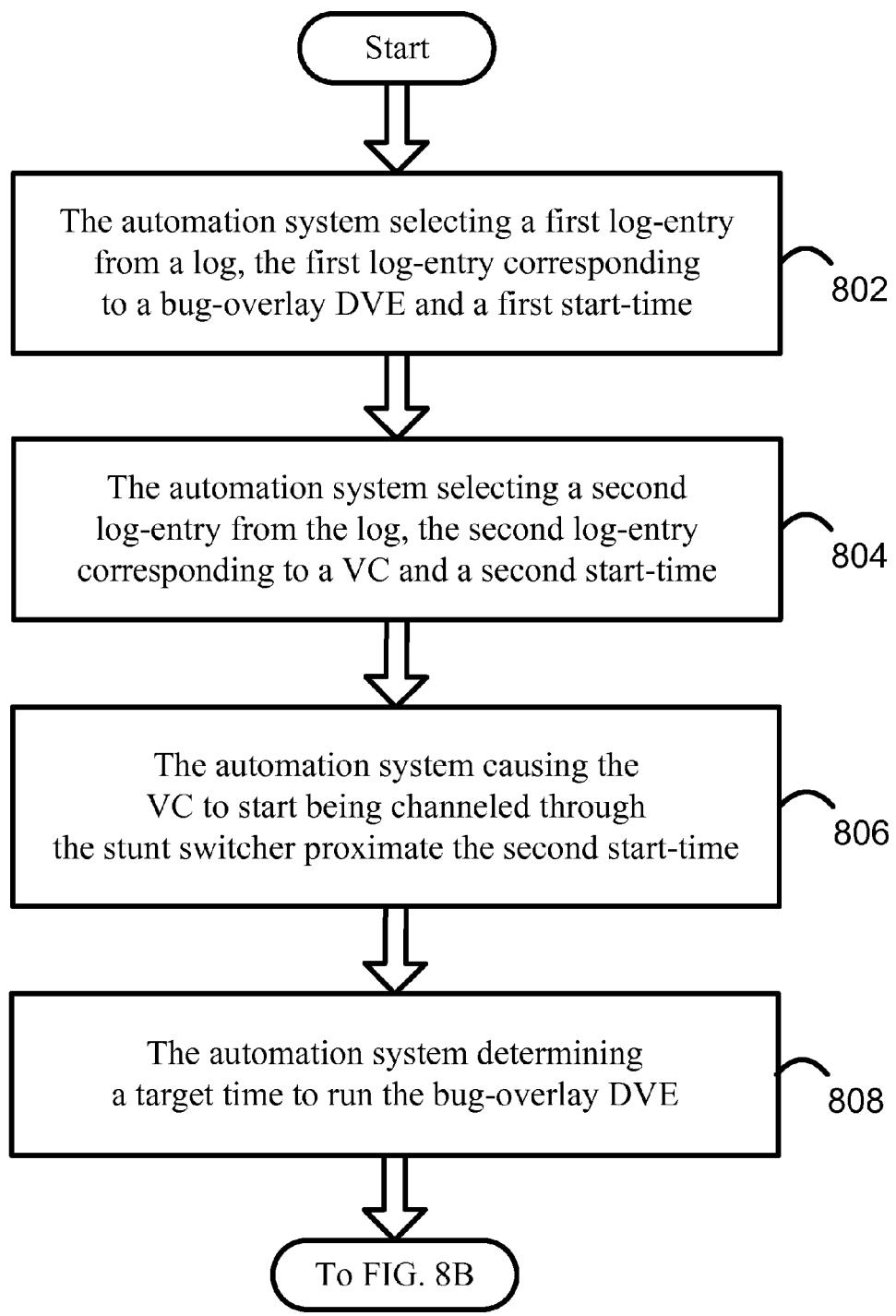
FIG. 8A shows a first part of a flow chart illustrating functions in accordance with another example method.
Figure 8B:
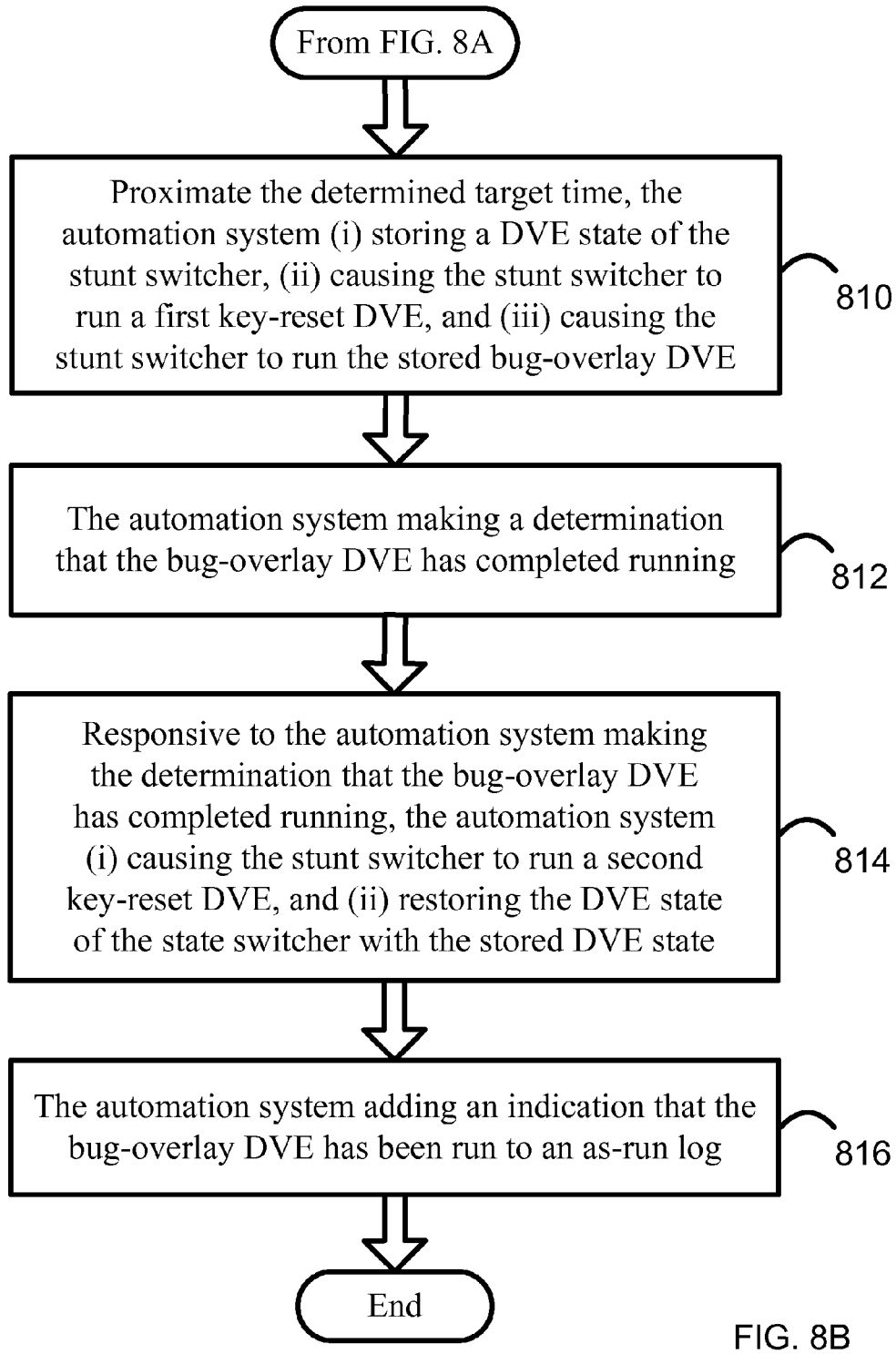
FIG. 8B shows a second part of the flow chart of FIG. 8A.

As a variation on the example method provided above, the automation system 508 may cause the stunt switcher 504 to perform additional functions related to storing and restoring DVE states of the stunt switcher. This may allow for temporarily removing an effect to make room for a bug, and then reinstating the effect once the corresponding bug-overlay DVE has completed running. FIG. 8 shows a flow chart illustrating functions in accordance with another example method that employs such a variation.

At block 802, 804, 806, and 808, the method may involve the functions discussed above at blocks 702, 704, 706, and 708, respectively. As such, at block 802, the method may involve the automation system 508 selecting a first log-entry from a log, where the first log-entry corresponds to a bug-overlay DVE stored in the stunt switcher 504, and to a first start-time. At block 804, the method may involve the automation system 508 selecting a second log-entry from the log, where the second log-entry may correspond to a VC and to a second start-time. At block 806, the method may involve the automation system 508 causing the VC to start being channeled through the stunt switcher proximate the second start-time. At block 808, the method may involve the automation system determining a target time to run the bug-overlay DVE.

At block 810, the method may involve proximate the determined target time, the automation system 508 storing a DVE state of the stunt switcher, causing the stunt switcher to run a first key-reset DVE, and causing the stunt switcher to run the stored bug-overlay DVE. The automation system 508 storing the state of the stunt switcher 504 may involve the automation system storing in the data storage 529 the state of one or more keys within the stunt switcher, such that the state may be restored at a later time. The key-reset DVE may be used to clear all keys (after they have been stored), such that the bug may be overlayed after the keys have been cleared.

At block 812, the method may involve the automation system 508 making a determination that the bug-overlay DVE has completed running. This automation system 508 may make this determination after the bug has been overlayed for a predetermined time-period, for instance. At block 814, the method may involve responsive to the automation system 508 making the determination that the bug-overlay DVE has completed running, the automation system causing the stunt switcher to run a second key-reset DVE, and restoring the DVE state of the stunt switcher with the stored DVE state. The second key-reset may be configured in the same manner as the first key-reset DVE such that the overlayed bug is removed. Upon restoring the DVE state of the stunt switcher 504, the DVEs that were running prior to the running of the first key-reset DVE may be restored. At block 816, the method may involve the automation system 508 adding an indication that the bug-overlay DVE has been run to an as-run log.

In one example, the first log-entry may include an identifier that maps to a set of scripts (or other program instructions), such as PHP-Hypertext-Preprocessor (PHP) scripts, that when executed by the automation system 508 cause the automation system to perform one or more of the functions, such as those at blocks 808-814 as described above. Notably, other types of scripts may also be used, including for example customized scripts that are configured to perform functions in a television-broadcasting environment. Such scripts may be executed by a corresponding interpreter installed in the automation system 508. In one example, the identifier may be stored in a house-identifier field of the log entry. The identifier may have a particular property (e.g., a predefined prefix) to allow the automation system 508 to differentiate between the identifier and a house identifier that is typically included in a house-identifier field (e.g., as with the second log-entry described above). As such, responsive to the automation system 508 determining that the first log-entry includes the identifier, the automation system 508 may execute the set of scripts and therefore, perform the corresponding functions. In one example, the automation system 508 may begin executing the set of scripts proximate the first start-time.

A further description of the manner in which an automation system 508 may use the identifier to trigger execution of the set of scripts is described in cross-referenced U.S. patent application Ser. No. 13/828,682, entitled "Systems and Methods for Causing a Stunt Switcher to Run a DVE."

In view of the discussion above, an example set of scripts is provided below (parameter descriptions are shown inside arrow brackets):

RUN_PHP ("TimeAndTempFirst30 Minutes.php,"<position>)
SET_CALLBACK (<position>, <label>)
<label>: LOAD_AND_ROUTE_KEY (<data identifier>, <data token>, <stunt-switcher key-identifier>, <stunt-switcher identifier>)
STORE_SWITCHER_STATE (<state>, <stunt-switcher identifier>)
RUN_EFFECT_PLAY_RUN_EFFECT (<bug-overlay DVE identifier>, <data token>, <key-reset DVE identifier>, <stunt-switcher identifier>)
WRITE_SWITCHER_STATE (<state>, <stunt-switcher identifier>)

The "RUN_PHP ("TimeAndTempFirst30 Minutes.php,"<position>)" command may cause the automation system 508 to run another script, namely the "TimeAndTempFirst30 Minutes.php" script that is configured to return a value indicating the closest time to fifteen minutes after the top of the hour while also corresponding to a show portion of a show-segment VC. This position is returned in the <position> parameter. Accordingly, the command RUN_PHP ("TimeAndTempFirst30 Minutes.php", P) may cause that position (i.e., the determined target time) to be stored as P.

The "SET_CALLBACK (<position>, <label>)" command causes the automation system 508 to resume executing the set of scripts at the label when the position is reached. For example, the command "SET_CALLBACK (P, label)" may cause the automation system to resume execution of the set of scripts at the label when the position P is reached.

The "LOAD_AND_ROUTE_KEY (<data identifier>, <data token>, <stunt-switcher key-identifier>, <stunt-switcher identifier>)" command may cause the automation system 508 to cause data from a character generator to be loaded and routed (sent) to an appropriate input that maps to the stunt-switcher key-identifier such that the data may be used in connection with a bug-overlay DVE. The data-identifier may function similar to a traditional house-identifier, except that it maps to a character generator that provides data. The data token may be used as an identifier such that other scripts (such as the "RUN_EFFECT_PLAY_RUN_EFFECT" script described below) may refer to the data without identifying a particular physical input of the stunt switcher 504. The stunt-switcher key-identifier and the stunt-switcher identifier collectively identify a particular key of a particular stunt switcher that data will be sent to. For example, a "LOAD_AND_ROUTE_KEY (*CG0200, T, 1, 504)" command may cause the automation system 508 to load data received from the character generator and send it (via the router 502) to an input of the stunt switcher 504 that maps to the key identified as 1. The automation system 508 may then use the token T to refer to the loaded data that will be sent in this manner.

The "STORE_SWITCHER_STATE (<state>, <stunt-switcher identifier>)" command may store a current DVE state of the identified stunt switcher. For example, the command STORE_SWITCHER_STATE (S, 508), would store the DVE state of stunt switcher 508 in a variable S.

The "RUN_EFFECT_PLAY_RUN_EFFECT (<bug-overlay DVE identifier>, <data token>, <key-reset DVE identifier>, <stunt-switcher identifier>)" command may cause the automation system 508 to cause a stunt switcher to run a bug-overlay DVE that uses the loaded data as referenced by the data token. Further, once the bug-overlay DVE ends, the automation system 508 may cause the stunt switcher to run a key-reset DVE. The key-reset DVE identifier identifies the key-reset DVE to run once the running of the bug-overlay DVE is completed. The stunt-switcher identifier identifies the stunt switcher that should run these DVEs.

For example, the command "RUN_EFFECT_PLAY_RUN_EFFECT (72, 99, 504, T) may cause the automation system 508 to cause the stunt switcher 504 to run a bug-overlay DVE identified as DVE 72 (stored in the data storage 529). In this example, the bug-overlay effect may run a key-reset DVE combined with a bug-overlay DVE. Further, the command may cause the automation system 508 to use in connection with the bug-overlay DVE, the data routed in accordance with the "LOAD_AND_ROUTE_KEY" command described above, and referred to by the data token T. Then, once the bug-overlay DVE terminates, the automation system 508 may cause the stunt switcher 504 to run the key-reset DVE identified as DVE 99.

The "WRITE_SWITCHER_STATE (<state>, <stunt-switcher identifier>)" command may restore a previously stored DVE state of the identified stunt switcher. For example, the command STORE_SWITCHER_STATE (S, 508), would restore the stunt switcher 508 with the DVE state previously stored in the variable S.

The "EXIT" command may terminate the automation system's 508 execution of the set of scripts.

The set of scripts may also be used to perform other functions, including for example adding an indication that the bug-overlay DVE has been run to an as-run log as described above. Further, the scripts may provide a "time out" period and a corresponding action to handle an instance in which the set of scripts runs for longer than the time out period. For example, the action may involve simply terminating execution of the set of scripts.

By using an identifier that maps to a set of scripts in the manner described above, a user (e.g., a traffic manager) may include an appropriate identifier in a log entry of the log to easily cause a stunt switcher to run a bug-overlay DVE at an appropriate time, all as configured in the corresponding set of scripts.

The automation system 508 may perform functions related to both the first and second log entries simultaneously, or perhaps contemporaneously. For example, the automation system 508 may cause a VC to be channeled through the stunt switcher 504, while simultaneously executing a set of scripts. As the set of scripts execute, the corresponding functions may be performed, and therefore a bug may be overlayed on the VC as the VC is being broadcast.

IV. Example Variations

While one or more functions of the disclosed methods have been described as being performed by the certain entities (e.g., the automation system 508), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applied to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A non-transitory computer-readable medium including a set of program instructions that when executed by a processor cause performance of a set of functions comprising:
   selecting a first log-entry from a traffic log, wherein the first log-entry corresponds to a bug-overlay digital video effect (DVE) stored in a stunt switcher, and to a first start-time;
   selecting a second log-entry from the traffic log, wherein the second log-entry corresponds to a video component (VC) and to a second start-time, wherein the second start-time is later than the first start-time;
   causing the VC to start being channeled through the stunt switcher proximate the second start-time;
   determining a target time to run the bug-overlay DVE; and
   causing the stunt switcher to run the stored bug-overlay DVE proximate the determined target time such that a bug is overlayed on the VC as the VC is being channeled through the stunt switcher.

2. The non-transitory computer-readable medium of claim 1, wherein the first start-time is a top of an hour; wherein the determined target time is either (i) within a range of thirteen minutes after the top of the hour and seventeen minutes after the top of the hour, or (ii) within a range of forty-three minutes after the top of the hour and forty-seven minutes after the top of the hour; and wherein the overlayed bug includes time and/or temperature data.

3. The non-transitory computer-readable medium of claim 1, wherein the first start-time is before a top of an hour; wherein the determined target time is within a range of three minutes before the top of the hour and three minutes after the top of the hour; and wherein the overlayed bug includes a station's call letters.

4. The non-transitory computer-readable medium of claim 1, wherein the determined target time is a closest time to a predetermined absolute time while also corresponding to a show portion of a show-segment VC.

5. The non-transitory computer-readable medium of claim 1, wherein the first log-entry includes a zero duration and wherein the second log-entry includes a non-zero duration.

6. The non-transitory computer-readable medium of claim 1, wherein the first and second log entries are non-adjacent in the log.

7. The non-transitory computer-readable medium of claim 1, wherein the first log-entry includes a house-identifier field and an identifier stored in the house-identifier field, wherein the identifier maps to a second set of program instructions that when executed, cause performance of the functions of: (i) determining the target time to run the bug-overlay DVE; and (ii) causing the stunt switcher to run the stored bug-overlay DVE proximate the determined target time such that the bug is overlayed on the VC as the VC is being channeled through the stunt switcher.

8. The non-transitory computer-readable medium of claim 7, wherein the second set of program instructions comprises a set of PHP-Hypertext-Preprocessor (PHP) scripts.

9. The non-transitory computer-readable medium of claim 1, the set of functions further comprising:
   adding an indication that the bug-overlay DVE has been run to an as-run log.

10. A non-transitory computer-readable medium including a set of program instructions that when executed by a processor cause performance of a set of functions comprising:

selecting a first log-entry from a traffic log, wherein the first log-entry corresponds to a bug-overlay digital video effect (DVE) stored in a stunt switcher, and to a first start-time;

selecting a second log-entry from the traffic log, wherein the second log-entry corresponds to a video component (VC) and to a second start-time, wherein the second start-time is later than the first start-time;

causing the VC to start being channeled through the stunt switcher proximate the second start-time;

determining a target time to run the bug-overlay DVE;

proximate the determined target time, (i) storing a DVE state of the stunt switcher, (ii) causing the stunt switcher to run a first key-reset DVE, and (iii) causing the stunt switcher to run the stored bug-overlay DVE such that a bug is overlayed on the VC as the VC is being channeled through the stunt switcher;

making a determination that the bug-overlay DVE has completed running; and responsive to making the determination that the bug-overlay DVE has completed running, (i) causing the stunt switcher to run a second key-reset DVE, and (ii) restoring the DVE state of the stunt switcher with the stored DVE state.

11. The non-transitory computer-readable medium of claim 10, wherein the first start-time is a top of an hour; wherein the determined target time is either (i) within a range of thirteen minutes after the top of the hour and seventeen minutes after the top of the hour, or (ii) within a range of forty-three minutes after the top of the hour and forty-seven minutes after the top of the hour; and wherein the overlayed bug includes time and/or temperature data.

12. The non-transitory computer-readable medium of claim 10, wherein the first start-time is before a top of an hour, wherein the determined target time is within a range of three minutes before the top of the hour and three minutes after the top of the hour; and wherein the overlayed bug includes a station's call letters.

13. The non-transitory computer-readable medium of claim 10, wherein the determined target time is a closest time to a predetermined absolute time while also corresponding to a show portion of a show-segment VC.

14. The non-transitory computer-readable medium of claim 10, wherein the first log-entry includes a zero duration and wherein the second log-entry includes a non-zero duration.

15. The non-transitory computer-readable medium of claim 10, wherein the first and second log entries are non-adjacent in the log.

16. The non-transitory computer-readable medium of claim 10, wherein the first log-entry includes a house-identifier field and an identifier stored in the house-identifier field, wherein the identifier maps to a second set of program instructions that when executed, cause performance of the functions of: (i) storing the DVE state of the stunt switcher, (ii) causing the stunt switcher to run a first key-reset DVE; (iii) causing the stunt switcher to run the stored bug-overlay DVE such that the bug is overlayed on the VC as the VC is being channeled through the stunt switcher; (iv) making the determination that the bug-overlay DVE has completed running; (v) responsive to making the determination that the bug-overlay DVE has completed running, (a) causing the stunt switcher to run the second key-reset DVE; and (b) restoring the DVE state of the stunt switcher with the stored DVE state.

17. The non-transitory computer-readable medium of claim 16, wherein the second set of program instructions comprises a set of PHP-Hypertext-Preprocessor (PHP) scripts.

18. The non-transitory computer-readable medium of claim 10, the set of functions further comprising:
adding an indication that the bug-overlay DVE has been run to an as-run log.

19. A television-broadcasting system comprising:
a stunt switcher; and
an automation system having a computer-readable medium including a set of program instructions, that when executed by the automation system, cause the automation system to perform a set of functions comprising:
selecting a first log-entry from a traffic log, wherein the first log-entry corresponds to a bug-overlay digital video effect (DVE) stored in the stunt switcher, and to a first start-time;
selecting a second log-entry from the traffic log, wherein the second log-entry corresponds to a video component (VC) and to a second start-time, wherein the second start-time is later than the first start-time;
causing the VC to start being channeled through the stunt switcher proximate the second start-time;
determining a target time to run the bug-overlay DVE;
proximate the determined target time, (i) storing a DVE state of the stunt switcher, (ii) causing the stunt switcher to run a first key-reset DVE, and (iii) causing the stunt switcher to run the stored bug-overlay DVE such that a bug is overlayed on the VC as the VC is being channeled through the stunt switcher;
making a determination that the bug-overlay DVE has completed running; and
responsive to making the determination that the bug-overlay DVE has completed running, (i) causing the stunt switcher to run a second key-reset DVE, and (ii) restoring the DVE state of the stunt switcher with the stored DVE state.

20. The television-broadcasting system of claim 19, wherein the first log-entry includes a house-identifier field and an identifier stored in the house-identifier field, wherein the identifier maps to a second set of scripts that when executed cause performance of the functions of (i) determining the target time to run the bug-overlay DVE, and (ii) causing the stunt switcher to run the stored bug-overlay DVE proximate the determined target time such that the bug is overlayed on the VC as the VC is being channeled through the stunt switcher.

* * * * *